Figure 1:
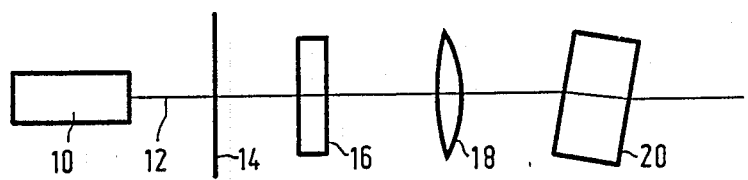

United States Patent [19]

Meijer et al.

[11] Patent Number: 4,958,087
[45] Date of Patent: Sep. 18, 1990

[54] ARRANGEMENT FOR AND METHOD OF DOUBLING THE FREQUENCY OF A LIGHT WAVE

[75] Inventors: Egbert W. Meijer; Edsko E. Havinga; Gerardus L. J. A. Rikken, all of Eindhoven, Netherlands

[73] Assignee: U.S. Philips Corporation, New York, N.Y.

[21] Appl. No.: 403,220

[22] Filed: Sep. 5, 1989

[30] Foreign Application Priority Data

Feb. 10, 1989 [NL] Netherlands ............................ 8900325

[51] Int. Cl.$^5$ ................................................. G02F 1/37
[52] U.S. Cl. ..................................... 307/;425; 307/427
[58] Field of Search ................ 307/425, 426, 427, 430

[56] References Cited

U.S. PATENT DOCUMENTS 4,410,239 10/1983 Kaplan et al. ....................... 350/354
4,707,303 11/1987 Buckley et al. .................... 372/21 X

OTHER PUBLICATIONS

Basov, N. G. (Ed.); Shigorin, V. D. (Auth.); "Investigation of Generation of the Second Optical Harmonic In Molecular Crystals", *Lebedev Physics Institute Series*, v. 98, 1982, pp. 77–139.

*Primary Examiner*—John D. Lee
*Attorney, Agent, or Firm*—Norman N. Spain

[57] ABSTRACT

The invention relates to an arrangement for and a method of doubling the frequency of a light wave, for example to convert infrared light originating from a laser into green light. To that end a fundamental light wave is circularly polarized and passed through a non-linear optical medium, a second harmonic wave then being formed. The non-linear optical medium is formed from a centrosymmetrical material, whose molecules or molecular groups evidence chirality.

11 Claims, 1 Drawing Sheet

ARRANGEMENT FOR AND METHOD OF DOUBLING THE FREQUENCY OF A LIGHT WAVE

The invention relates to an arrangement for and a method of doubling the frequency of a light wave, in which a fundamental light wave is passed through a non-linear optical medium, a second harmonic wave then being formed.

Such a method and an arrangement in the form of a planar waveguide are described in the European Pat. Application No. EP 254921, in which a fundamental light wave is generated with the aid of a semiconductor laser having, for example a wavelength of 1060 nm (infrared). In that case the non-linear optical medium is a thin layer of a crystalline organic material. A good yield of green light having a wavelength of 530 nm is obtained with the arrangement.

From theoretical considerations, based on an electric dipole approach it is generally concluded that a centrosymmetrical medium is not suitable for providing frequency doubling, see, for example the article by D.J. Williams in Angewandte Chemie 96, pages 637–651 (1984), more specifically page 638. When crystals are used, asymmetry is consequently often introduced in the molecule so as to obtain a non-centrosymmetrical crystal structure. If chiral molecules, such as amino acids are used, it is necessary to use only left-hand or right-hand rotating enantiomers instead of a mixture of them.

In an article by K.E. Rieckhoff and W.L. Peticolas in Science 147 Pages 610–611 (1965) it is stated that a racemic mixture of d and l enantiomers cannot be used to provide frequency doubling unless the dl-mixture crystallises in a non-centrosymmetrical manner, which however is very exceptional for amino acids.

The theoretical considerations by P.S. Pershan in Physical Review 130 (3) pages 919–929 (1963) show that it is possible to generate a second harmonic wave with a very poor yield in centrosymmetrical media by utilizing a quadruple moment. This has also been demonstrated for calcite by R.A.W. Terhune, P.D. Maker and C.M. Savage, see Phys. Rev. Lett. 8, pages 404–406 (1962).

The invention has for its object to provide an arrangement and a method of frequency doubling using an alternative non-linear optical material, in which a separation into enantiomers or a particular orientation of an organic material are not necessary. The invention contemplates inter alia to enable frequency doubling of light from a laser in a simple manner, for example for telecommunication by means of optical fibres and for the optical storage of information. When short-wave light is used, the information density can be increased and the write and erase possibility of information is enlarged.

According to the invention, the object to provide such an arrangement is accomplished by an arrangement of the type described in the opening paragraph, the arrangement including means for circularly polarising the fundamental light wave and in which the non-linear optical medium is formed from a centrosymmetrical material whose molecules or molecule particles evidence chirality. Examples of molecules evidencing chirality are molecules having chiral or asymmetrical carbon atoms, molecules having an inherent dissymmetry such as helix structures, molecules having a frozen chiral conformation and meso-compounds being molecules having chiral molecular groups and an internal mirror surface or internal point symmetry.

The non-linear optical centrosymmetrical medium may, for example consist of a liquid crystalline material or of Langmuir-Blodgett layers. In a particularly suitable embodiment of the arrangement according to the invention the centrosymmetrical material is a monocrystalline material.

Circularly polarised light must be understood to mean in the sequel of this description also light which is at least partly circularly polarised, for example elliptically polarised light.

The fundamental light wave can, for example, be polarised circularly by means of an appropriate polarising filter and a $\lambda/4$ plate. In a special embodiment of the arrangement according to the invention the circular polarisation of the fundamental light wave is obtained in that the centrosymmetrical crystalline material is a double refractive material. Double refraction occurs, for example, in anisotropic crystal structures.

In a suitable embodiment of the arrangement according to the invention the centrosymmetrical crystalline material is a mesocompound, that is to say a material in which two enantiomer groups which are each others mirror image are present in symmetrical positions in the molecules. Suitable examples of such materials are $\alpha$-truxillic acid and $\alpha$-truxillamide.

In a preferred embodiment of the arrangement according to the invention the centrosymmetrical crystalline material consists of a racemic mixture of dl pairs. Suitable materials are, for example, dl-N-acetylvaline and dl-sezine.

The object to provide a method of doubling the frequency is accomplished in accordance with the invention by a method of the type defined in the opening paragraph, in which the fundamental light wave is circularly polarised at least partly and in which the non-linear optical medium is formed from a centrosymmetrical monocrystalline material, whose molecular groups evidence chirality.

In a specific embodiment the fundamental light wave is elliptically polarised because the centrosymmetrical crystalline material is double-refractive and the fundamental light wave is radiated in such manner into the arrangement that it is not parallel to an optical axis.

The meso-compounds used in accordance with the invention are centrosymmetrical. A racemic mixture often crystallises out in a shape in which in the unit cell of the crystal structure d and l-enantiomers are present in symmetrical positions, as a result of which the crystal structure is centrosymmetrical. In accordance with the invention, it was found that these types of centrosymmetrical materials can be used for the generation of a second harmonic wave, since when circularly polarised light is used a preferred interaction occurs with one of the two enantiomeric molecules or molecule groups. This causes the centrosymmetry to be broken and a non-linear interaction to occur. In other words, the invention utilizes the magnetic dipole moment, and also the electric dipole moment.

Organic crystals are frequently used in efforts to generate a second harmonic wave. In order to obtain a high efficiency it is useful to use molecules having a high dipole moment, but those molecules are often centrosymmetrically arranged in pairs in a crystal, precisely as a result of that high dipole moment. As a result thereof averaging of the effect occurs, so that these materials are in general not suitable for use. The invention now provides the possibility to still obtain a frequency doubling to a useful extent by utilizing the selectivity of circularly polarized light, in the presence of mesocompounds or pairs of dl-enantiomers.

Figure 2:
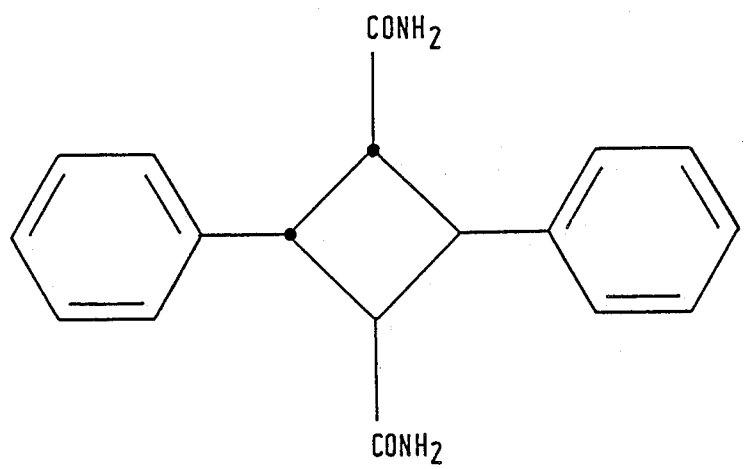

The invention will now be described in greater detail with reference to embodiments and the accompanying drawing, in which FIG. 1 is a schematic representation of an arrangement according to the invention, and in which FIG. 2 illustrates the structural formula of α-truxillamide.

EXAMPLE 1

FIG. 1 shows a laser light source 10, which in the experiments described here is a Nd:YAG laser, with which a light wave 12 having a wavelength of 1064 nm is generated. The light wave is sent to a polarisation filter 14 and to a λ/4 plate to obtain a circularly polarised fundamental light wave which is focused onto a crystal 20 by means of a lens 18.

In an arrangement for doubling the frequency of a light wave the light, if so desired, can alternatively be transferred by means of optical fibres, for example quartz glass fibres. Other types of lasers instead of a Nd:YAG laser may alternatively be used, such as, for example, semiconductor lasers.

In this embodiment the crystal 20 is formed by a monocrystal of dl-N-acetylvaline, which is obtained by crystallisation from a racemic solution in ethanol. The crystal is centrosymmetrical, the space group of the crystal structure is $P2_1/c$.

The fundamental light ray is radiated perpendicularly onto the bc-crystal face alter having been circularly polarised. A second harmonic wave is generated having a wavelength of 532 nm, whose intensity is quadratically dependent on the intensity of the fundamental wave. The second harmonic wave has a plane polarization along the b-axis of the monocrystal when the fundamental wave is radiated parallel to the c-axis. In accordance with the symmetry in a $P2_1/c$ crystal lattice, the other polarisations cancel each other.

In accordance with this embodiment, the intensity of the second harmonic wave is a factor of 9 greater than in an identical arrangement, in which a wave having plane polarisation is radiated into the arrangement in parallel with the c-axis of the crystal. When an elliptically polarised light wave is radiated into the arrangement, a second harmonic wave is generated, the intensity of which is proportional to the circular character of the elliptically polarised light wave.

EXAMPLE 2

An experiment is made as described in example 1, in which however a plane polarised light wave is focused onto the crystal. The light wave is radiated perpendicularly to the bc-crystal face at a polarisation angle $\theta$ with the c-axis. An optimum result is obtained when the angle $\theta$ is equal to 45°. In that case the intensity of the second harmonic wave is a factor 7 greater than for an arrangement in which the plane polarised light wave is radiated into the arrangement parallel to the c-axis, $\theta = 0°$.

This experiment is explained as follows. Because the crystal has a monoclinic, therefore anisotropic crystal structure, it evidences double refraction. If the light wave is not radiated into the arrangement in parallel with an optical axis, the light wave is polarised fully circularly or partly circularly (elliptically) thereby, whereafter a non-linear interaction with the chiral material may occur.

EXAMPLE 3

An experiment is performed as described in example 1, in which a circularly polarised fundamental light wave is radiated at an angle in which phase matching occurs, that is to say an angle at which the fundamental light wave and the second harmonic wave effectively experience the same index of refraction in the crystal. In accordance with this embodiment the crystal is rotated for that purpose through +11° in the ab-crystal face.

This results in a plane polarised second harmonic wave with polarisation along the b-axis, having an intensity which is a factor 10 greater than in accordance with the embodiments 1 and 2.

EXAMPLE 4

The fundamental light Wave is focused onto the crystal with a plane polarisation along the c-axis ($\theta = 0°$), the phase match angle being choses such that in response to double refraction an optimum combination of circular polarisation and phase matching is obtained in the crystal. In accordance with this example, the crystal is rotated through + 30° in the ab-crystal face, relative to a perpendicular radiation.

The result is a plane polarised second harmonic wave at a polarisation along the b-axis, having an intensity which is factor 10 hiqher than for the example 1 and 2.

EXAMPLE 5

An arrangement is used in accordance with example 1, in which however the crystal is a monocrystal formed from dl-serine, having a $P2_1/a$ crystal structure.

The intensity of the generated second harmonic wave is 3% of the intensity under identical circumstances when an inorganic crystal of potassium dihydrogen phosphate is used.

EXAMPLE 6

An arrangement is used in accordance with example 1, in which however the crystal is formed from a mesocompound A suitable meso-compound is α-truxillic acid, which can, for example, be obtained by photodimerisation of cinnamic acid. In accordance with this example α-truxillic amide is used, see FIG. 2, of which simpler monocrystals can be produced.

The result is a second harmonic wave having an intensity of approximately 5% of the intensity when potassium dihydrogen phosphate, KDP, is used, the other circumstances being the same.

We claim:

1. An arrangement for doubling the frequency of a light wave, in which a fundamental light wave is passed through a non-linear optical medium, a second harmonic wave then being formed, characterized in that the arrangement includes means for circularly polarising the fundamental light wave and that the non-linear optical medium is formed from a monocrystalline centrosymmetrical material whose molecules or molecular group evidence chirality.

2. An arrangement as claimed in claim 1, characterized in that the centrosymmetrical crystalline material is a material with double refraction.

3. An arrangement as claimed in claim 2, characterized in that the centrosymmetrical crystalline material is a meso-compound.

4. An arrangement as claimed in claim 3, characterized in that the meso-compound is α-truxillamide.

5. An arrangement as claimed in claim 2, characterized in that the centrosymmetrical crystalline material consists of a zacemic mixture of dl pairs.

6. An arrangement as claimed in claim 5, characterized in that the centrosymmetrical crystalline material consists of dl-N-acetylvaline.

7. An arrangement as claimed in claim 5, characterized in that the centrosymmetrical crystalline material consists of dl-serine.

8. An arrangement as claimed in claim 1, characterized in that the centrosymmetrical crystalline material consists of a racemic mixture of dl pairs.

9. An arrangement as claimed in claim 1, characterized in that the centrosymmetrical crystalline material is a meso-compound.

10. A method of doubling the frequency of a light wave, in which a fundamental light wave is passed through a non-linear optical medium, a second harmonic wave then being formed; characterized in that the fundamental light wave is at least partly circularly polarised and that the non-linear optical medium is formed from a centrosymmetrical monocrystalline material, whose molecules or molecular groups evidence chirality.

11. A method as claimed in claim 10 characterized in that the fundamental light wave is elliptically polarised because the centrosymmetrical crystalline material is a material having double refraction and the fundamental light wave being radiated into the arrangement not in parallel with an optical axis.

* * * * *